H. B. MEREDITH.
AUTOMATIC FILM WINDING MECHANISM FOR CAMERAS.
APPLICATION FILED AUG. 22, 1916.
1,221,558.
Patented Apr. 3, 1917.
3 SHEETS—SHEET 1.
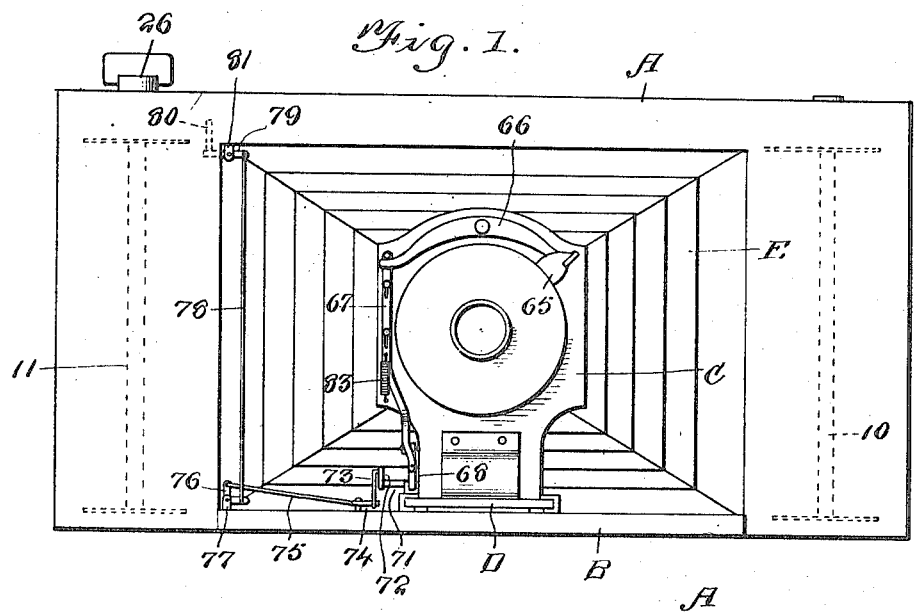
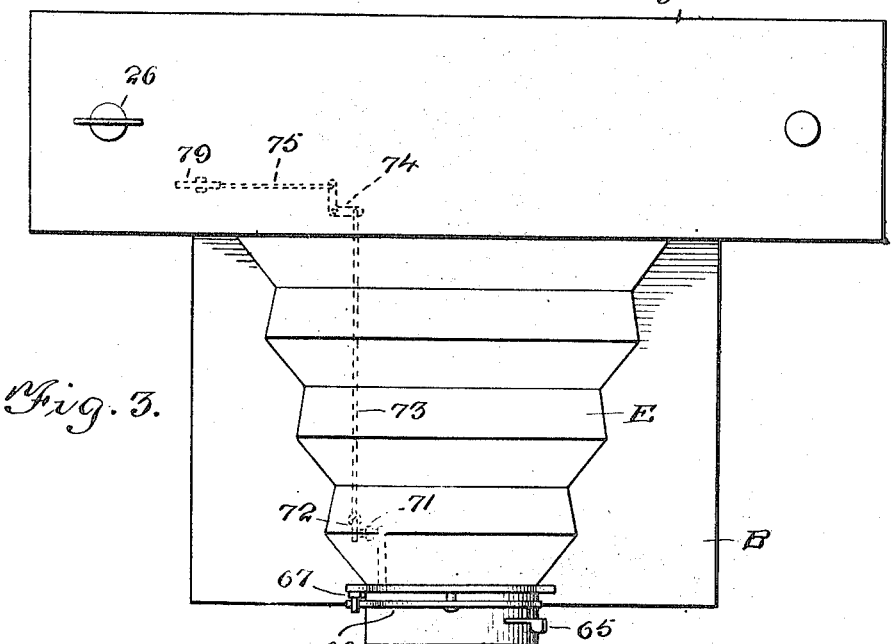
Inventor
H. B. Meredith
By Victor J. Evans
Attorney
Witnesses

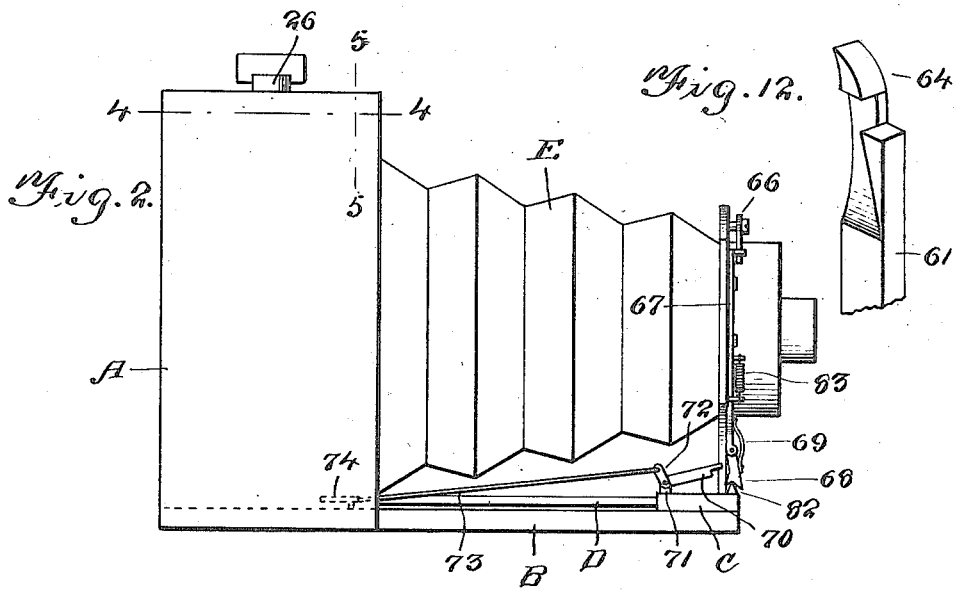
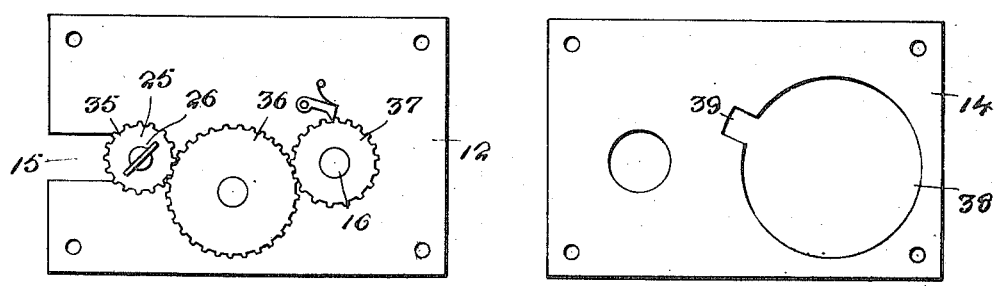
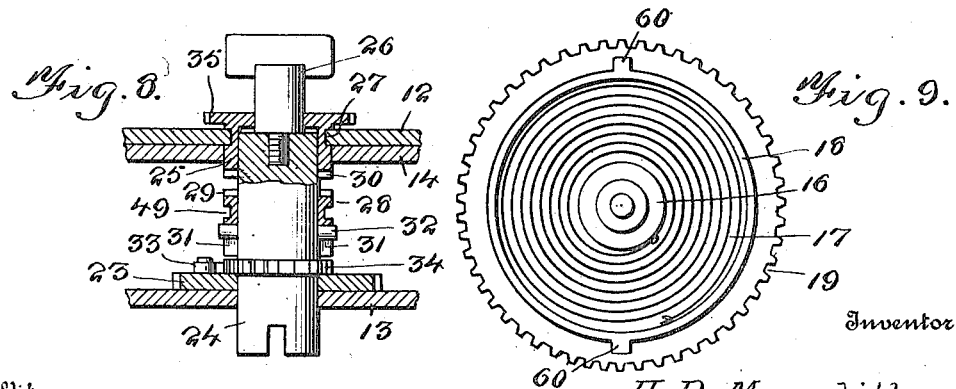

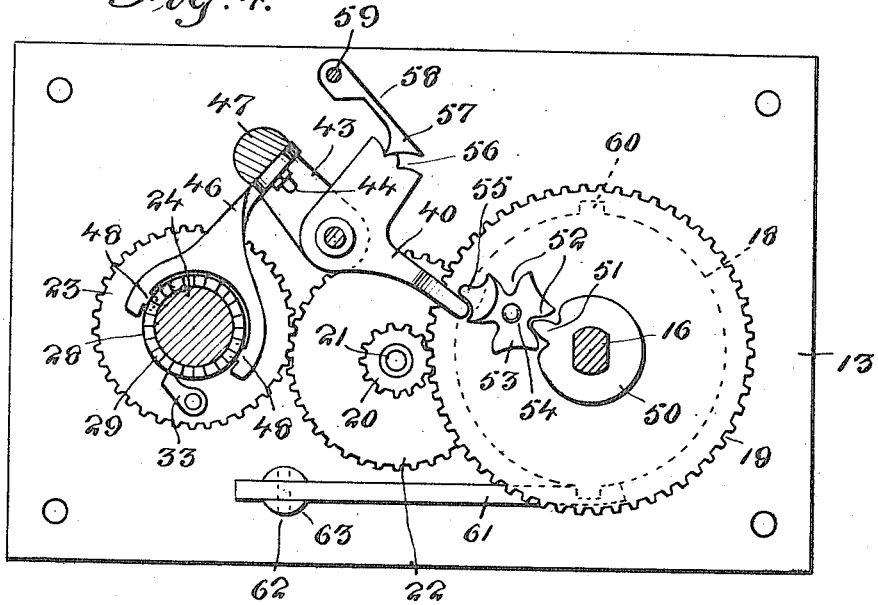
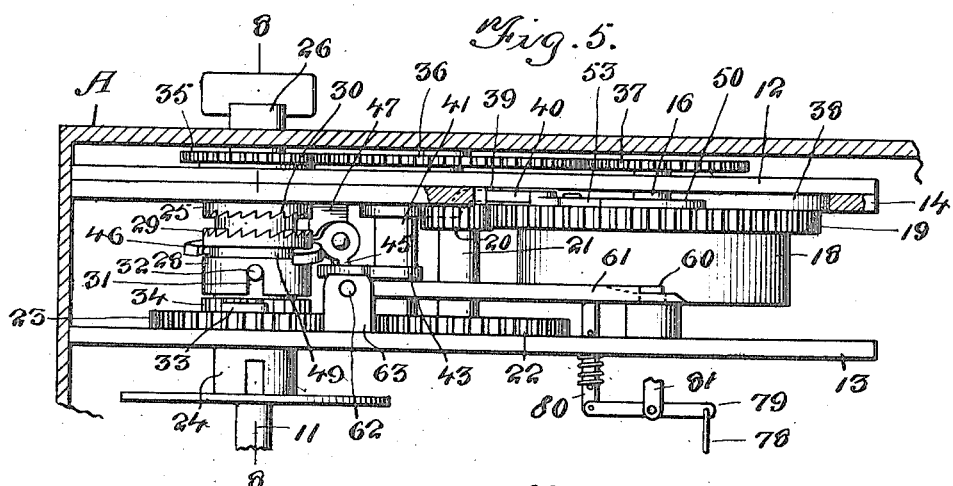
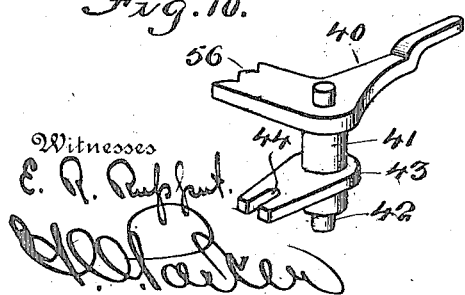
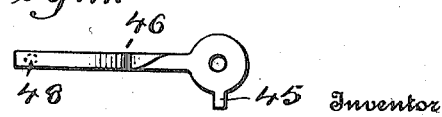

UNITED STATES PATENT OFFICE.

HERBERT B. MEREDITH, OF McALESTER, OKLAHOMA.

AUTOMATIC FILM-WINDING MECHANISM FOR CAMERAS.

1,221,558. Specification of Letters Patent. Patented Apr. 3, 1917.

Application filed August 22, 1916. Serial No. 116,351.

*To all whom it may concern:*

Be it known that I, HERBERT B. MEREDITH, a citizen of the United States, residing at McAlester, in the county of Pittsburg and State of Oklahoma, have invented new and useful Improvements in Automatic Film-Winding Mechanisms for Cameras, of which the following is a specification.

The invention relates to camera attachments, and more particularly to the class of automatic film winding devices for cameras.

The primary object of the invention is the provision of a device of this character wherein the necessity of the hand winding of the film before or after each exposure is entirely eliminated, as the film is automatically wound after each exposure, the film spools being of the ordinary construction and are readily insertible in and removable from the body of the camera, as usual.

Another object of the invention is the provision of a device of this character wherein the construction thereof is novel in form to assure compactness and is capable of being mounted in different styles of cameras without requiring structural changes in their make-up so that the film, when placed within the same, will be automatically wound after each exposure, thereby obviating the usual hand winding of said film.

A still further object of the invention is the provision of a device of this character which is simple in construction, thoroughly reliable and efficient in operation, readily and easily mounted within and removed from a camera and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which is indicated in the appended claims.

In the accompanying drawings:

Figure 1 is a front elevation of a camera showing the device constructed in accordance with the invention applied thereto, the front swinging section of the camera being open and the camera ready for taking a picture;

Fig. 2 is a side elevation thereof;

Fig. 3 is a top plan view;

Fig. 4 is a sectional view on the line 4—4 of Fig. 2;

Fig. 5 is an enlarged sectional view taken on the line 5—5 of Fig. 2, looking downwardly;

Fig. 6 is a plan view showing the winding gears.

Fig. 7 is a detail plan view of one of the frame plates.

Fig. 8 is a sectional view on the line 8—8 of Fig. 5.

Fig. 9 is a bottom plan view of the winding drum and spring.

Fig. 10 is a detail perspective view of the trip lever and adjunct parts.

Fig. 11 is a side view of the clutch throw fork.

Fig. 12 is a detail perspective view of the escapement arm.

Fig. 13 is a fragmentary detail elevation of the winding drum, cam and trip wheel.

Similar reference characters indicate corresponding parts throughout the several views of the drawings.

Referring to the drawings in detail, A designates the box-like body of a camera which, in this instance, is of the folding type, having the swinging front B as usual which, when opened, supports the lens carriage C, the same being movable over a track D and fastened in adjusted position thereon in the ordinary well known manner, the said track D being mounted upon the front B as usual. The lens carriage C is shifted for the extending or collapsing of the bellows E of the camera. It is of course to be understood that this particular style of camera is merely shown to illustrate the application and the manner of use of the automatic winding device hereinafter fully described.

Arranged within the camera body A at one end thereof is the normally wound film carrying spool 10 which is detachably held therein in the usual well known manner, while arranged within and at the opposite end of said camera body A is the film winding spool 11 which is also detachably held within the said body and coöperates with the automatic winding device hereinafter described.

The automatic winding device comprises spaced parallel outer cheek plates 12 and 13 and inner plate 14, which are fastened in relative position in any desirable manner, the inner plate 14 being juxta-positioned to the outer plate 12, which latter plate is formed with a slot 15 opening through one end and extending a short distance longitudinally of said plate. Journaled in the cheek and inner plates 12, 13 and 14 is a spring winding arbor 16 to which is fixed one end of a main winding spring 17 inclosed within a cylindrical casing 18 having passed loosely therethrough centrally of the same the shaft 16 so that the casing 18 is free for rotation thereon. Formed peripherally on the casing 18 is a driving gear 19 meshing with a pinion 20 fixed to a countershaft 21 journaled in the plates 13 and 14, and upon this countershaft is fixed a driven gear 22 meshing with a second gear 23 loosely journaled upon a film winding spool arbor 24, one end thereof being journaled in the plate 13, while the other end fits within a clutch member 25 which is formed with an external groove 27 so as to fit into the slot 15, and this member 25 is journaled in the plate 14 next to the slotted plate 12, as shown. Passed centrally through a suitable aperture in the member 25 is the stem of a key 26, the stem being threaded into the arbor 24 for rotation therewith, while the hub is loose upon the arbor 24 and the stem of the key 26.

The hub 25 is loose upon the arbor 24 and slidable upon this arbor 24 is a clutch sleeve 28 which is formed with ratchet clutch teeth 29, which are adapted to mesh with similar ratchet clutch teeth 30 formed on the hub 25, the sleeve being formed with slots 31 opening through one end thereof and in which engage pins 32 fixed in the arbor 24 so that the said sleeve 28 will rotate therewith yet can freely slide thereon for the engagement of the teeth 29 and 30 or the disengagement of the same in a manner presently described.

The gear 23 has pivoted thereon a ratchet pawl 33 which engages a ratchet wheel 34 formed on the arbor 24 so that on the turning of the latter in one direction the gear 23 will rotate therewith, yet the said gear is free for rotation in the reverse direction independently of the arbor and likewise said arbor is free for rotation in the reverse direction. The arbor 24 detachably engages with the winding spool 11 so that on the rotation of the casing 18 under the action of the spring 17 the said spool 11 will be rotated for the automatic winding of the film thereon from the spool 10 within the body A of the camera.

Fixed to the hub 25 is a gear 35 which meshes with an intermediate gear 36 rotatably mounted upon the plate 12 and this gear 36 meshes with a gear 37 fixed to the main shaft or arbor 16 so that on the turning of the key 26 the same, through the medium of said gears 35, 36 and 37, will effect the winding of the spring 17 interiorly of the casing 18, as will be apparent.

The plate 14 is formed with a circular opening 38 corresponding to the size or diameter of the gear 19 on the casing 18 and intersecting this opening is a slot 39 through which protrudes one limb of an L-shaped trip lever 40 fixed to a sleeve 41 rotatable upon a supporting shaft 42 mounted in the plates 13 and 14 and also fixed to this sleeve 41 is a bifurcated arm 43, the bifurcation 44 of which engages a lug 45 formed on a clutch throw fork 46, pivoted for movement upon a bracket 47 fixed to the plate 13, the fork 46 being formed with studs 48 engaging in a groove 49 at diametrically opposite points thereof formed in the sleeve 28 so that the teeth 29 will engage with and disengage from the teeth 30 on the movement of the fork 46 in a manner presently described.

Fixed to the shaft 16 is a disk like trip cam 50, a tooth 51 of which is adapted to engage in any one of a series of notches 52 formed in a trip wheel 53 rotatably journaled at 54 eccentrically on the casing 18, and upon this wheel 53 is fixed a trip finger 55 which is arranged out of the plane of the cam 50 to clear the same on the rotation of the wheel 53 but is arranged in the path of one limb of the trip lever 40 so that on the rotation of the disk cam 50 the wheel 53 will be turned in a direction to throw the lever 40 in one direction and thereby shift the clutch sleeve 28 upon the arbor 34 and upon rotation of the casing 18 the said lever 40 will be moved in the reverse direction and thus slide the clutch sleeve 28 in an opposite direction upon the arbor 24 and thereby disengage and engage the clutch teeth 29 and 30, as will be apparent.

The other arm of the trip lever 40 is formed with a stop tooth 56 with which engages the latch end 57 of a gravity pawl 58 pivoted at 59 to the plate 13 so that the lever 40 is held in its shifted position for holding the clutch teeth 29 and 30 out of engagement with each other or in engagement with each other in the automatic working of the device.

Formed at diametrically opposite points on the periphery of the spring casing 18 are lugs 60, with either of which engages an escapement arm 61 pivoted at 62 to a bearing 63 on the plate 13, and this latch is formed with a beveled portion 64 so that when said arm is disengaged from one lug 60 for the rotation of the casing 18 the other lug will act upon the beveled portion 64 of the arm for moving it into locking engagement with said lug, thereby permitting the casing 18 to rotate a half revolution under the tension of the spring 17 when the arm 61 is disengaged from said casing in a manner presently described.

Pivotally mounted upon the lens carriage C and engaged with the shutter operating lever 65 is a rocking arm 66 which acts upon a lifting rod 67 having pivoted to its lower end a trip latch pawl 68 against which works a leaf spring 69 connected to the rod 67 for moving the pawl 68 into engagement with a trip member 70 pivoted in a bearing 71 on the front B, the member being formed with an extension 72 to which is connected a flexible cable 73, the same being also connected to one arm of a bell crank 74 pivoted to the bottom of the body A of the camera and to the other arm of the crank 74 is connected a link 75, the same being connected to a secondary bell crank 76 pivoted in a bearing 77 on the bottom of the body A of the camera and to this bell crank 76 is connected a rod 78, the same being connected to a rocking arm 79 which acts upon a push pin 80 mounted in the plate 13 in the path of the escapement arm 61, the arm 79 being pivoted in a bearing 81 depending from the top of the body A of the camera.

On the base of the carriage C in the path of the pawl 68 is a nib or projection 82 which serves to deflect said pawl 68 on the completed downward movement of the rod 67 release the trip member 70 and when the pawl moves downwardly with said rod 67 it is in engagement with the trip member 70 so that a pull is exerted upon the cable 73, thereby rocking the arm 79 which engages the pin 80 to move the latter, which acts upon the escapement arm 61, releasing it from the casing 18 and when the spring 17 is wound said casing rotates and imparts similar movement to the winding spool 11 for the winding of the film thereon, which film moves a limited distance within the body A of the camera intermittently for the successful exposure thereof as usual, the film being moved automatically by the winding thereof upon the winding spool 11 which is rotated in a manner hereinbefore set forth.

Connected with the rod 67 is a coiled retractile spring 83 which is also connected to the lens carriage C and this spring exerts a downward pull upon said rod after pressure has been relieved from the operating end of the arm 66 which is actuated on depressing the shutter lever 65 for making an exposure of the film in the taking of a picture.

In the operation of the device, after the placing of a film wound upon the spool 10 within the body A of the camera and said film is attached to the spool 11 as usual to provide for the initial exposure of the film, it is necessary to rotate the key 26 which winds the usual backing of the film upon the spool 11 until the initial stretch of the film is in position for an exposure in the taking of a picture with the camera. When the key 26 is turned for the proper positioning of the film for the first exposure thereof the clutch sleeve 28 is in position for its teeth 29 to engage the teeth 30, so that the spool 11 is rotated and at the same time the gears 35, 36 and 37 are in operation for the winding of the spring 17 within the casing 18 which is held stationary or immovable by the escapement arm 61, and upon the complete winding of the spring 18 the trip lever 40 is acted upon by the finger 55 as the nose 51 of the cam disk 50 will rotate the wheel 53, thereby shifting the lever 40 which, in its turn, operates the fork 46 for moving the clutch sleeve 28 out of engagement with the hub 25 of the key 26, thereby freeing the hub 25 from the arbor 24, it being understood, of course, that the casing 18 is unlocked so that the spool 11 may be rotated for the further winding of the film.

When it is desired to expose the film the shutter lever 65 is depressed which actuates the arm 66, operating the rod 67 by lifting the same to bring the pawl 68 into engagement with the trip member 70, and upon releasing pressure upon the lever 65 the spring 83 becomes active to lower the rod 67 which forces the trip member downwardly, thereby exerting a pull upon the cable 73 which operates the rod 78, locking the arm 79 which moves the pin 80, the latter acting upon the escapement arm 61 to release it from engagement with the casing 18, thereby permitting the main spring 17 to unwind. On rotation of the casing 18 the gears 22 and 23 are driven and the ratchet connection of the gear 23 with the arbor 24 rotates the same to turn the spool 11 for the further winding of the film thereon a predetermined distance until the escapement arm 61 engages the next lug 60 on the casing 18, thereby stopping the rotation of the same. This operation is repeated on the successive operation of the shutter lever 65, it being apparent that upon each complete revolution of the casing 18 the trip wheel 53 is rotated a single notch and when the said wheel 53 has made a complete rotation it will act upon the trip lever 40 which, through its connection with the clutch sleeve 28, throws the latter into locking engagement with the hub 25 and at this time the film has been completely exposed, that is, six exposures have been made thereon. When a new film has been placed within the camera the operation hereinbefore set forth is repeated. It will be obvious that on a complete rotation of the casing 18 two exposures will have been made and each complete rotation of said casing turns the wheel 53 a single notch and this wheel on completing a full rotation serves to shift the trip lever 40 for operating the clutch. When the wheel 53 has made a complete revolution six exposures of the film have been made, it being understood, of course, that by increasing the number of lugs on the casing 18 and varying the size of the gears 22 and 23 a larger number of exposures of the film can be made, as will be obvious, and this is contemplated within the scope of the invention.

From the foregoing description, taken in connection with the accompanying drawings, the construction and manner of operation of the herein described camera attachment will be readily apparent and, therefore, a more extended explanation has been omitted.

Having thus described my invention, I claim:

1. In a camera, a film-advancing motor comprising a spring-actuated drum, a film-winding shaft, a gear having a pawl and ratchet connection with said film-winding shaft normally loose thereon and geared to said drum, a clutch member journaled on said film-winding shaft, a spring-winding arbor on which said drum is journaled geared to said clutch member, a clutch rotatable with but slidable on said film-winding shaft and movable into and out of engagement with said clutch member, drum holding and releasing means, and clutch-shifting means actuated by the spring winding arbor after a predetermined number of revolutions.

2. In a camera, a film-advancing motor comprising a spring-actuated drum, a film-winding shaft, a gear having a pawl and ratchet connection with said film-winding shaft normally loose thereon and geared to said drum, a clutch member journaled on said film-winding shaft, a spring-winding arbor on which said drum is journaled geared to said clutch member, a clutch rotatable with but slidable on said film-winding shaft and movable into and out of engagement with said clutch member, drum holding and releasing means, clutch-shifting means actuated by the spring winding arbor after a predetermined number of revolutions, said drum holding and releasing means comprising a pivoted escapement arm, projections on the drum with which said arm coöperates, and connections by which said escapement arm is moved to release the drum, the clutch-shifting means comprising a clutch-operating fork operatively connected with said escapement arm.

3. An automatic film winder for cameras comprising a frame adapted to be secured to the camera body, a spring actuated drum journaled in the frame, lugs at predetermined points on the drum, means for engaging and releasing said lugs, means actuated by said drum for rotating a film spool within the camera body, a clutch means for throwing the spring winding arbor into and out of driving engagement with the drum, means for releasing the lug engaging means, and means coöperating with the clutch for winding the spring.

In testimony whereof I affix my signature.

HERBERT B. MEREDITH.